Jan. 27, 1948.  G. GOULD  2,435,075
FISH SCALING CLAMP
Filed May 16, 1944
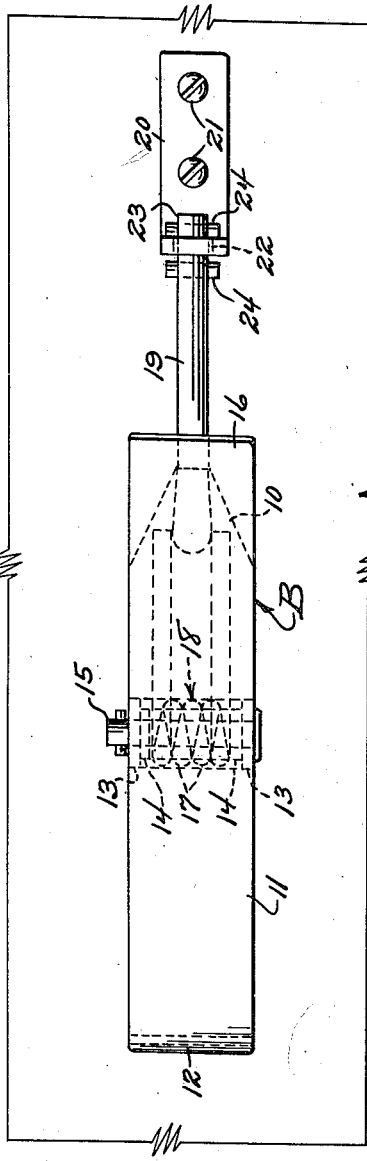
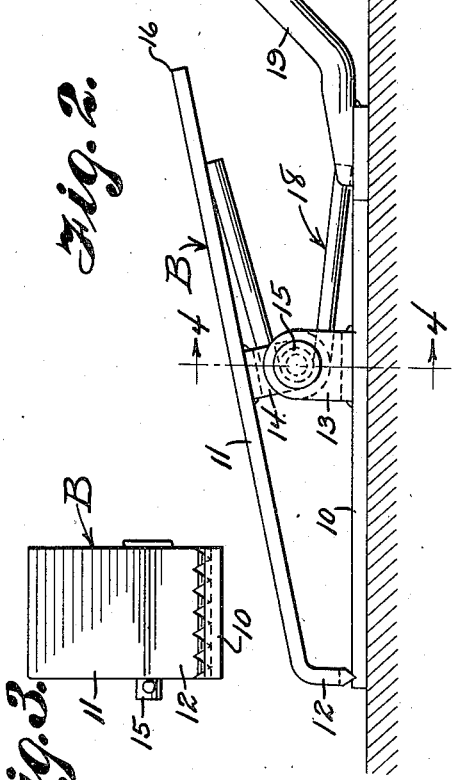
George Gould INVENTOR.
BY
Victor J. Evans & Co.
ATTORNEYS Patented Jan. 27, 1948

2,435,075

UNITED STATES PATENT OFFICE 2,435,075

FISH SCALING CLAMP

George Gould, Madison, S. Dak.; Minnie B. Gould, administratrix of said George Gould, deceased Application May 16, 1944, Serial No. 535,847

1 Claim. (Cl. 17—8)

The invention relates to a clamp and more particularly to a fish holder for use in cleaning fish.

The primary object of the invention is the provision of a holder of this character, wherein a fish to be scaled can be firmly and conveniently held upon a support, so that the scaling thereof can be effectively had with dispatch and thoroughness, the holder being of novel construction to maintain the fish flat upon the support during cleaning and scaling of the same.

Another object of the invention is the provision of a holder of this character, wherein the same is readily and easily manipulated for the holding of the fish or to permit removal thereof, as well as enabling different sizes of fish to be held thereby for the cleaning of the same.

A further object of the invention is the provision of a holder of this character, wherein it can be swiveled to a bracket mounted upon a flat support, to be maintained in a working condition at all times.

A still further object of the invention is the provision of a holder of this character, which is simple in construction, thoroughly reliable and efficient, strong, durable, convenient for use on a support, readily and easily operated, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing:

Figure 1 is a top plan view of the holder constructed in accordance with the invention and in working position upon a support.

Figure 2 is a side elevation thereof.

Figure 3 is an end view.

Figure 4 is a sectional view taken on the line 4—4 of Figure 2 looking in the direction of the arrows.

Similar reference characters indicate corresponding parts throughout the several views in the drawing.

Referring to the drawing in detail A designates generally a flat support, that is to say, a portion thereof, such as a table top plank or the like, while B denotes generally a holder constituting the present invention and hereinafter set forth in detail.

The holder B comprises a clamp involving stationary and movable jaws 10 and 11, respectively, the former being a flat blade-like part, while the jaw 11 is formed with a toothed claw end 12 directed inwardly toward the jaw 10 to make contact therewith on the closing of the jaw 11 with relation thereto. These jaws approximately midway of their length have built therewith pivot ears 13 and 14, for matching relation to each other and carry a cross-pivot pin 15, which pivotally connects the stationary jaw 10 with the movable jaw 11, the latter at its heel end 16 constituting a handle or lever portion.

About the pivot pin 15 are the coils 17 of a tensioning spring 18 which functions to urge the jaw 11 in a closing position and maintains the same under tension at all times.

The heel end of the jaw 10 has connected thereto and projecting therefrom a crooked shank or rod-like stem 19, which is located at the longitudinal center of the said jaw 10, the latter being adapted to rest flat against the support when the clamp is in normal working position. Secured to this support A is a substantially L-shaped bracket 20, having one arm thereof horizontally disposed against the support where it is secured by fasteners 21 thereto, while the vertically arranged arm of this bracket 20 has a hole 22 therein at its upper portion to loosely receive the coupling end 23 of the stem or shank 19 for the swivel connection of the latter with the said bracket.

The end 23 of the shank or stem 19 fore and aft of the vertical arm of the bracket 20 has fitted therein cross-pins 24, which loosely couple the stem or shank 19 with the said bracket 20, as is clearly apparent in Figures 1 and 2 of the drawing. The crooked formation of the shank or stem 19 permits the clamp to be readily and easily reversed or turned over from one side to the other, as may be required in the use thereof.

The tail of a fish is firmly and securely held in the clamp so that the said fish throughout its body can be laid flat upon the support A for convenient cleaning, scaling or otherwise dressing of such fish in a ready and convenient manner. By opening the movable jaw 11 the tail of the fish can be released from the clamp.

What is claimed is:

A holder of the kind described, comprising a jawed, spring tensioned clamp having a flat blade-like member forming one of the jaws of the clamp, a crooked stem extending from said clamp, said crooked stem comprising upper and lower horizontally disposed portions interconnected by a downwardly inclined portion, said lower portion being connected with said blade-like member, a fixed bracket having an outstanding swiveled connection with said upper horizontally disposed portion of the crooked stem, and cross-pins in said upper portion fore and aft of said swiveled connection for loosely coupling said stem to said fixed bracket.

GEORGE GOULD.

REFERENCES CITED

The following references are of record in the file of this patent:

UNITED STATES PATENTS

| Number | Name | Date |
|---|---|---|
| 614,287 | Hargis | Nov. 15, 1898 |
| 710,734 | Armstrong | Oct. 7, 1902 |
| 1,438,091 | Bowe | Dec. 5, 1922 |
| 1,632,194 | Possehl | June 14, 1927 |
| 2,312,160 | Haislip | Feb. 23, 1943 |